United States Patent [19]

Kosuda et al.

[11] Patent Number: 5,272,120
[45] Date of Patent: Dec. 21, 1993

[54] BLOCK GUAGE AND METHOD OF MARKING CERAMIC MATERIAL

[75] Inventors: Tetsuo Kosuda, Miyazaki; Yoshirou Kamata, Utsunomiya; Kinji Takizawa, Miyazaki, all of Japan

[73] Assignee: Mitutoyo Corporation, Japan

[21] Appl. No.: 907,047

[22] Filed: Jul. 1, 1992

Related U.S. Application Data

[63] Continuation-in-part of Ser. No. 468,247, Jan. 22, 1990, abandoned.

[51] Int. Cl.⁵ .............. C04B 35/48; C04B 35/49; G03C 5/00
[52] U.S. Cl. .................. 501/105; 501/102; 501/103; 501/152; 33/DIG. 11; 219/121.6; 430/346
[58] Field of Search ............ 501/86, 102, 103, 104, 501/152, 105; 33/D11; 219/121.6, 121.68, 121.69; 430/346

[56] References Cited

U.S. PATENT DOCUMENTS

| | | | |
|---|---|---|---|
| 4,430,279 | 2/1984 | Hagio et al. | 264/65 |
| 4,542,110 | 9/1985 | Nakada et al. | 501/103 |
| 4,656,145 | 4/1987 | Soroi | 501/86 |
| 4,769,310 | 9/1988 | Gugger et al. | 430/346 |
| 5,103,073 | 4/1992 | Danilov et al. | 219/121.68 |

FOREIGN PATENT DOCUMENTS

| | | |
|---|---|---|
| 61-26561 | 2/1986 | Japan. |
| 63-188701 | 8/1988 | Japan. |
| 63-148804 | 9/1988 | Japan. |
| 63-321275 | 7/1990 | Japan. |

OTHER PUBLICATIONS

"Tesaramic Ceramic Gauge Blocks Setting the Standards for the World!", TESA Reference Standards Div., Tesa Metrology, Ltd., Mar. 1990.
Feb. 18, 1992 Japanese Patent Office Action (see Appendix paragraph 6).
"PROZYR", Ceramiques Techniques Desmarquest, France Jul. 1, 1986.
"Data Sheet 12: Ceramic Gage Blocks, Series 516", Mitutoyo Corporation, Apr. 1989.
Rupert Le Grant, "Ceramic Gages and Fixtures", American Machinist/Metalworking Manufacturing, Jan. 21, 1963, p. 98.

*Primary Examiner*—Karl Group
*Assistant Examiner*—Michael A. Marcheschi
*Attorney, Agent, or Firm*—Oliff & Berridge

[57] ABSTRACT

A method of making a ceramic material by radiating a laser beam onto the portion of said ceramic material to be marked in a low oxygen atmosphere and a block gauge marked by this marking method. This marking method enables a ceramic material to have a distinct mark. A block gauge composed of a ceramic material has excellent properties such as corrosion resistance.

14 Claims, No Drawings

BLOCK GUAGE AND METHOD OF MARKING CERAMIC MATERIAL

CROSS-REFERENCE TO RELATED APPLICATION

The present application is a continuation-in-part of U.S. patent application Ser. No. 07/468,247, filed Jan, 22, 1990, now abandoned.

BACKGROUND OF THE INVENTION

1. Field of the Invention

The present invention relates to a block gauge and method of marking ceramic material and more particularly, a block gauge used as a reference gauge in precisely measuring a length and a method of marking a ceramic material used for the block gauge.

2. Background Art

A conventional block gauge is made of a metal material.

A block gauge of a metal material, however, has insufficient corrosion resistance and corrodes easily. For this reason, the handling of such a block gauge requires considerable care. For example, it is necessary to store the block gauge in a completely corrosion-preventive environment, and the block gauge must be handled with corrosion-preventive gloves on.

If corrosion occurs, the surface state of the face indicating the dimension is impaired, thereby making it impossible to maintain the accurate dimension or to bring the block gauge into close contact with another block gauge, in a process called wringing.

In order to enhance the corrosion resistance, the block gauge may be plated with more corrosion-resistant materials, e.g., chrome Cr. However, a plated block gauge increases the number of manufacturing steps and it is difficult to provide a predetermined nominal dimension, thereby making the manufacture of a plated block gauge complicated.

In order to solve problems caused by the metal material, a block gauge made of ceramic material is developing. As marking methods for the block gauge made of a ceramic material, a painting method and a laser radiating method are known.

Although the painting method is a very easy method, a protrusion of the painted material is produced at the marking point having the same effects as corrosion on a metal block gauge.

On the other hand, a recessed mark is obtained by the laser radiating method, but obtaining a mark that has enough contrast to the ceramic material is very difficult.

SUMMARY OF THE INVENTION

Accordingly, it is an object of the present invention to eliminate the above-described problems in the prior art to provide a block gauge made of a ceramic material having a mark that has sufficient contrast to the ceramic material.

The present invention provides a block gauge composed of a ceramic material obtained by sintering zirconium oxide as a main ingredient, 3 to 7 wt % of yttrium and 0 to 20 wt % of aluminum oxide, the ceramic material being marked by radiating a laser beam onto the portion to be marked in a low oxygen atmosphere.

In the specification, the low oxygen atmosphere means the existence of less oxygen than the usual atmosphere.

An inert gas atmosphere or a state under reduced pressure can be preferably adopted as the low oxygen atmosphere.

The present invention provides a method of marking a ceramic material by radiating a laser beam onto the portion to be marked while maintaining the ceramic material in a low oxygen atmosphere.

The present inventor selected a ceramic material because it is a corrosion-resistant material and has homogeneity. More particularly, a white or yellow ceramic material is selected because it supplies contrast to the surroundings of a job site and is distinguishable. Furthermore, a ceramic material having a sufficient corrosion resistance, a thermal expansion coefficient substantially equal to that of a steel, which is generally an object of measurement, a dense and homogeneous structure, and satisfying the condition that the volume does not change after sintering is preferred. A zirconia ceramic material is used which is obtained by sintering zirconium oxide $ZrO_2$ as the main ingredient together with 3 to 7 wt % of yttrium oxide $Y_2O_3$ and 0 to 20 wt % of aluminum oxide $Al_2O_3$ based on the main ingredient as adjuvants. The above-described composition produces a zirconia ceramic material in a mixed phase of a hexagonal phase and a monoclinic phase, what is called a partially stable state, thereby providing the zirconia material with high strength, high toughness and resistance to brittleness.

The marks placed on the block gauge, such as a nominal dimension, the number of the article and a trademark, are preferably of a black color, which supplies a contrast to the white or light yellow zirconia ceramic material. It is necessary that the marked surface has the same or lower height than the wringing surface in order to enable wringing. The present inventor solved the problems of the color of the marks and the height of the marks with respect to the wringing surface by radiating laser beams onto the portion to be marked in a low oxygen atmosphere.

As the inert gas atmosphere, nitrogen ($N_2$), helium (He), argon (Ar) or a mixture thereof is preferable. The inert gas atmosphere is obtained by blowing the inert gas onto the portion of the zirconia ceramic material to be marked or introducing the inert gas into a sealed chamber that accommodates the zirconia ceramic material.

The reduced pressure means a pressure under 26 cmHg.

For radiation of a laser beam, a YAG laser generating device is preferably used in Q switch mode. Alternatively, a $CO_2$ laser generating device may be used.

The above and other objects, features and advantages of the present invention will become clear from the following description of the preferred embodiments thereof.

DESCRIPTION OF THE PREFERRED EMBODIMENT

The present invention will be explained in detail with reference to the following embodiment.

$ZrO_2$ as the main ingredient and $Y_2O_3$ and $Al_2O_3$ as adjuvants are pulverized to a predetermined particle diameter, and they are mixed and stirred in a uniform state.

The material in a uniform state is pressed and molded into a compact state called a packed state, and heated for sintering.

The zirconia ceramic material (in block form) obtained by sintering is cut with a diamond cutter into a rectangular parallelepiped slightly larger than a predetermined dimension.

The rectangular parallelepiped is ground into the form of a block gauge by lapping using a diamond, or the like, such that each surface has a predetermined flatness. Each of the opposing faces secures the parallelism, while the nominal dimension coincides with a predetermined dimension.

A laser beam having a frequency of 8 KHz is radiated from a YAG laser generating device onto the surface of the shaped zirconia ceramic material to be marked in a Q switch mode at an output of 7 W and at a rate of 22 mm/sec while blowing $N_2$ gas from an $N_2$ gas nozzle at an angle of 30 to 60 degrees from a distance of 3 cm at a pressure of about 1.0 kg/cm$^2$, thereby marking the surface with a nominal number, the number of article and a trademark. An inert gas atmosphere can also be selected from any one of nitrogen, helium and argon, or any mixture thereof.

The block gauge obtained in the above-described process is composed of a zirconia ceramic material that is free from corrosion. It is therefore unnecessary to store the block gauge in a corrosion-preventive state or handle it with corrosion-preventive gloves on. In addition, the block gauge has homogeneity and there is substantially no dimensional change.

A zirconia block gauge is milk white which supplies contrast to the surroundings of a job site sufficient to be distinguishable, so that it is prevented from being lost.

By the laser beam irradiation under specific low oxygen conditions, sharp and clear black marks slightly recessed in the form of a groove are obtained. The marks are produced by a chemical reduction process which is improved by reducing or eliminating the presence of oxygen around the immediate marking area. The marks therefore supply a sufficient contrast to the milk color of the substrate and is, therefore, easily read. In addition, according to the above-described marking method, since the flatness is maintained in each surface without producing any protrusion such as a marking by the painting method in the prior art, there is no trouble bringing it into close contact with another zirconia block gauge. The light-resistance test (test for a period equivalent to 10 years) was made on the marks by using a carbon arc lamp, but the marks remained as they were without any change.

The thermal expansion coefficient of the zirconia block gauge measured about $10 \times 10^{-6}$/°C. The thermal expansion coefficient of steel is about $11.5 \times 10^{-6}$° C. Therefore, even when the temperature of the environment changes, if the object of measurement is made of steel, the thermal expansion coefficient of a zirconia block gauge approximately follows the thermal expansion coefficient of the object of measurement, thereby preventing a large error from being produced due to a temperature change.

When the wear-resistance test was carried out by placing a zirconia block gauge on a FC surface plate (cast iron plate) and moving the block gauge a friction length of 8,000 m in a planetary state at a rate of 260 cm/min while applying a predetermined load to the block gauge, wear of about 0.07 μm was observed. In the wear-resistance tests under the same conditions, the wear of steel was about 0.7 μm, and the wear of a hard metal was about 0.25 μm. The zirconia block gauge has a wear resistance about ten times higher than steel, and about 3.5 times higher wear resistance than a hard metal has.

In the wear-resistance test of the zirconia block gauge, a phenomenon such as cracking, breaking and chipping was not produced and it was observed that sufficient resistance to brittleness was maintained.

The following tests were performed in order to ascertain the preferred conditions for marking ceramic block gauges.

COMPARISON 1

A zirconia ceramic material was prepared as described above.

A laser beam having same conditions as described above, but with no inert gas, such as blowing $N_2$ gas, is radiated onto the surface of the zirconia ceramic material.

Performing the laser beam radiation as described herein, marks that are sharp and brown for the most part, but partly black, were obtained and uniformity of the mark could not be achieved. The color of the mark was not uniform and insufficiently contrasted the color of the zirconia ceramic material.

COMPARISON 2

A zirconia ceramic material was prepared as described above.

A laser beam having a frequency of 8 KHz is radiated from the YAG laser generating device onto the surface of the shaped zirconia material to be marked at an output of 10 W; but without blowing $N_2$ gas.

Performing the laser beam radiation as described herein, black but dull non-contrasting marks were obtained. The line of the mark was insufficiently sharp.

EXAMPLE 1

A zirconia ceramic material was prepared as described above.

A laser beam having a frequency of 8 KHz is radiated from the YAG laser generating device onto the surface of the shaped zirconia material to be marked at an output of 7 H under a reduced pressure level of 26 cmHg.

Performing the laser beam radiation as described in this example, black and sharp marks were obtained. The line width of the mark, however, was not uniform and partly narrow.

EXAMPLE 2

A zirconia ceramic material was prepared as described above.

A laser beam having a frequency of 8 KHz is radiated from the YAG laser generating device onto the surface of the shaped zirconia material to be marked at an output of 10 W under a reduced pressure level of 26 cmHg.

Performing the laser beam radiation as described in this example, uniform black and sharp marks were obtained.

EXAMPLE 3

A zirconia ceramic material was prepared as described above.

A laser beam having a frequency of 8 KHz is radiated from the YAG laser generating device onto the surface of the shaped zirconia material to be marked at an output of 10 W under a reduced pressure level of 56 cmHg.

Performing the laser beam radiation as described in this example, sharp but slightly brown marks were obtained. Therefore, it is preferable to reduce the pressure under about 50 cmHg and more preferably under 26 cmHg when the reduced pressure method is adopted.

In these embodiments, if a burr is produced in the adjacent portion to the black and recessed groove during the marking operation by the radiation of a laser beam under specific conditions, it is possible to remove the burr by grinding, as desired.

The block gauge may be produced by cutting a zirconia ceramic material (in the form of a block) into a rectangular parallelepiped (the shape of a block gauge) slightly larger than a predetermined dimension, marking the rectangular parallelepiped zirconia ceramic material by the radiation of a laser beam under specific conditions, and thereafter grinding the zirconia ceramic material so that the nominal dimension coincides with the predetermined dimension.

As described above, a block gauge according to the present invention is advantageous in many ways. It is easy to handle because the corrosion resistance is such that the block gauge can be handled with bare hands, no corrosion-preventive treatment is necessary after use, and the storage of the block gauge under special conditions is unnecessary. Since the material is homogeneous, there is substantially no dimensional error. Both wear resistance and resistance to brittleness are also realized. Since the substrate is of a white or light yellow color, it supplies a contrast to the surroundings of a job site and marks which are black. In addition, since the thermal expansion coefficient is close to that of steel, when the object of measurement is steel, the error due to a temperature change is greatly reduced.

While there has been described what is at present considered to be a preferred embodiment of the invention, it will be understood that various modifications may be made thereto, and it is intended that the appended claims cover all such modifications as fall within the true spirit and scope of the invention as defined by the claims.

What is claimed is:

1. A block gauge comprising a ceramic material of uniform color composed of sintered zirconium oxide as a main ingredient, 3 to 7 wt % of yttrium oxide and 0 to 20 wt % of aluminum oxide, said ceramic material being irradiated by a laser in a low oxygen atmosphere having less oxygen than ambient atmosphere to produce recessed marks on at least one surface of the ceramic material, the recessed marks having a uniform color contrasting with the color of the ceramic material.

2. A block gauge, as recited in claim 1, wherein:
said low oxygen atmosphere is an inert gas atmosphere.

3. A block gauge, as recited in claim 2, wherein:
said inert gas atmosphere comprises at least one of nitrogen gas, helium gas and argon gas.

4. A block gauge, as recited in claim 1, wherein:
said low oxygen atmosphere is a reduced pressure atmosphere.

5. A block gauge, as recited in claim 4, wherein:
said reduced pressure atmosphere is under 56 cmHg.

6. A block gauge, as recited in claim 4, wherein:
said reduced pressure atmosphere is no greater than 26 cmHg.

7. A block gauge, as recited in claim 4, wherein:
said reduced pressure atmosphere is in the range of 10-56 cmHg.

8. A method of marking a ceramic material of uniform color composed of sintered zirconium oxide as a main ingredient, 3 to 7 wt % of yttrium oxide and 0 to 20 wt % of aluminum oxide, comprising the steps of:
supplying low oxygen atmosphere having less oxygen than ambient atmosphere to a surface of the ceramic material to be marked;
radiating a laser beam in said low oxygen atmosphere on a portion of said surface to be marked, said laser beam producing a recessed mark having a uniform color contrasting said uniform color of said ceramic material.

9. A method of marking a ceramic material, as recited in claim 8, wherein:
said low oxygen atmosphere is an inert gas atmosphere.

10. A method of marking a ceramic material, as recited in claim 9, wherein:
said inert gas atmosphere comprises at least one of nitrogen gas, helium gas and argon gas.

11. A method of marking a ceramic material, as recited in claim 8, wherein:
said low oxygen atmosphere is a reduced pressure atmosphere.

12. A method of marking a ceramic material, as recited in claim 11, wherein:
said reduced pressure atmosphere is under 56 cmHg.

13. A method of marking a ceramic material, as recited in claim 11, wherein:
said reduced pressure atmosphere is no greater than 26 cmHg.

14. A method of marking a ceramic material, as recited in claim 11, wherein:
said reduced pressure atmosphere is in the range of 10-56 cmHg.

* * * * *